United States Patent [19]

Holmes et al.

[11] 4,411,531
[45] Oct. 25, 1983

[54] EXTRUDER ASSEMBLY

[75] Inventors: George Holmes, West Chicago; Frank Keyser, Streamwood, both of Ill.

[73] Assignee: Thomas R. Vigil, Barrington, Ill.

[21] Appl. No.: 312,233

[22] Filed: Oct. 19, 1981

[51] Int. Cl.³ .................. B29B 1/06; B01F 15/02
[52] U.S. Cl. ..................... 366/76; 222/413; 425/225; 425/580
[58] Field of Search .............. 366/76, 79–83, 366/87, 88, 90, 150, 183, 181, 154; 264/39; 425/207, 208, 580, 583, 585, 225; 198/747, 550, 616; 100/137, 138, 139, 232; 222/413, 259, 148

[56] References Cited

U.S. PATENT DOCUMENTS 1,518,129 12/1924 Banbury ........................... 366/76
1,683,051 9/1928 Peterson .......................... 366/76
2,972,774 2/1961 MacLeod ......................... 366/77
3,057,008 10/1962 Hartmann ........................ 366/76

Primary Examiner—Robert W. Jenkins
Attorney, Agent, or Firm—Thomas R. Vigil

[57] ABSTRACT

The extruder assembly includes a barrel, a screw received within the barrel, a motor drive and transmission connected to one end of the screw for driving same and an extruding die at the other end of the barrel through which material is forced by the screw. The barrel has a slot therein and the assembly further includes a ram feed assembly having two pivotally mounted ram sections positioned on either side of the barrel for forcing molten plastic through the slot into the barrel. The ram sections are pivotable between an upper operating position and a lower exposed position providing easy access to the ram sections for cleaning and maintenance thereof.

15 Claims, 6 Drawing Figures

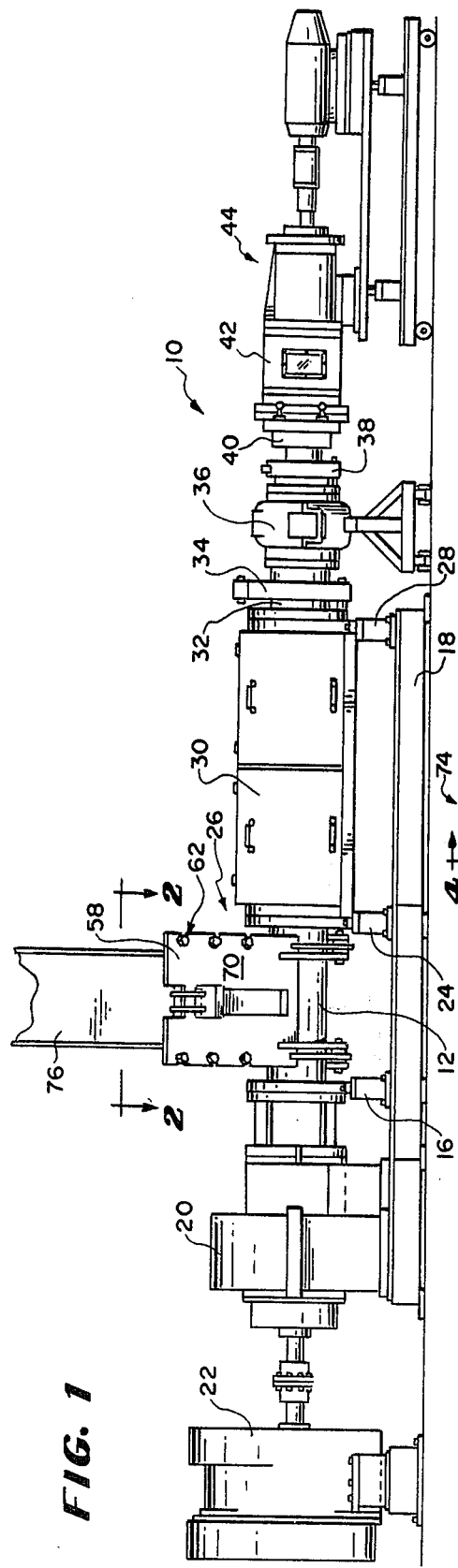
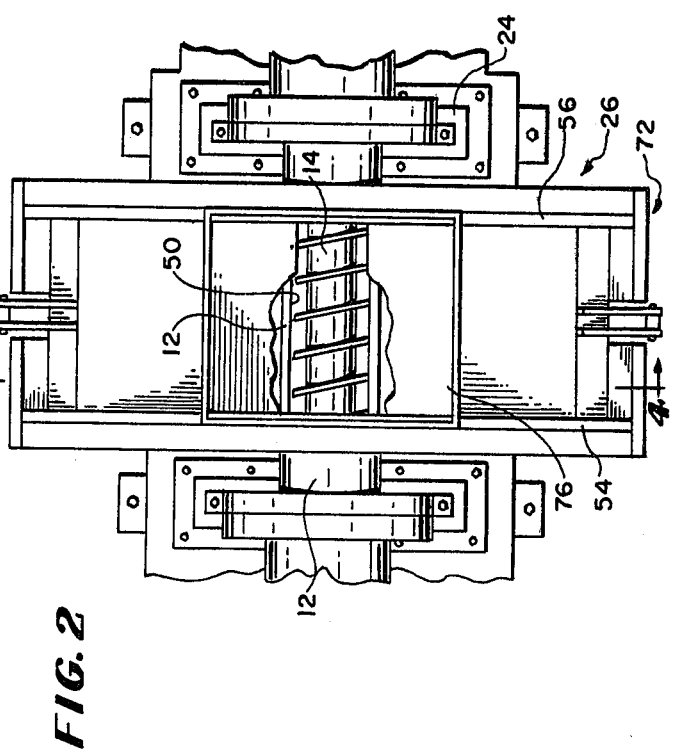
FIG. 1
FIG. 2

EXTRUDER ASSEMBLY

BACKGROUND OF THE INVENTION

1. Field of the Invention

The present invention relates to an extruder assembly and more specifically to a pivotable ram section or subassembly in a double ram feed assembly for an extruder assembly for extruding plastic material.

2. Description of the Prior Art

Heretofore extruder assemblies and more specifically extruder assemblies for extruding plastic material have included an inlet feed hopper positioned above a slot in a barrel of the extruder assembly. A screw is received in the extruder assembly. Rams are mounted for movement in the hopper along upper side wall surfaces of include side wall plates forming part of the hopper for the purpose of pushing lumps of molten plastic material (batches of pigmented polyethylene) into and through the slot and into engagement with the rotating screw which moves the material toward the forward end of the barrel of the extruder assembly.

From time to time, a ram becomes jammed because of material accumulating between the under surface of the ram and the upper side wall surface of the hopper on which the ram is movable. Also from time to time parts of the ram need to be cleaned, repaired or replaced. When this occurs, the side wall plates of the hopper and the ram need to be disassembled. Because of the weight of the rams and plates, material handling equipment is needed to handle the components of the ram and the plates as the hopper and ram are disassembled. This is awkward, time consuming and expensive.

In view of the material handling equipment and the man power needed for maintenance, the extruder assembly downtime is high and the cost for cleaning and maintaining the rams is quite expensive.

As will be described in greater detail hereinafter, the extruder assembly of the present invention includes a double ram feed assembly comprising two pivotable ram sections or subassemblies. Each section includes a ram, a ram plate forming a side wall of the hopper, and an articulated assembly which permits the ram assembly to be moved between an upper releasably-fixed-in-place position where the ram plate and ram form part of a double ram feeding hopper assembly and a lower position where the ram plate and ram are in a generally horizontal, unobstructed position permitting easy access to the ram and ram plate for the cleaning and maintenance thereof.

SUMMARY OF THE INVENTION

According to the invention there is provided in an extruder assembly including a barrel, a screw received within said barrel, drive means connected to one end of said screw for driving same, a slot in said barrel, feeding means associated with said slot for feeding material through said slot into said extruder barrel, and extruding means at the other end of said barrel through which material is forced by said screw, the improvement residing in said feeding means comprising at least one ram feed assembly including a ram plate positioned at one side of said slot in said barrel and a ram positioned for movement on the upper surface of said ram plate, means for moving said ram plate between an upper position where said ram plate forms a material feeding plate and where material is forced by said ram into said slot, and a lower position where said upper surface of said ram plate and said ram are exposed for maintenance and repair.

BRIEF DESCRIPTION OF THE DRAWINGS

FIG. 1 is a side elevational view of the extruder assembly of the present invention.

FIG. 2 is a fragmentary horizontal sectional view taken along line 2—2 of FIG. 1.

DESCRIPTION OF THE PREFERRED EMBODIMENTS

Figure 3:
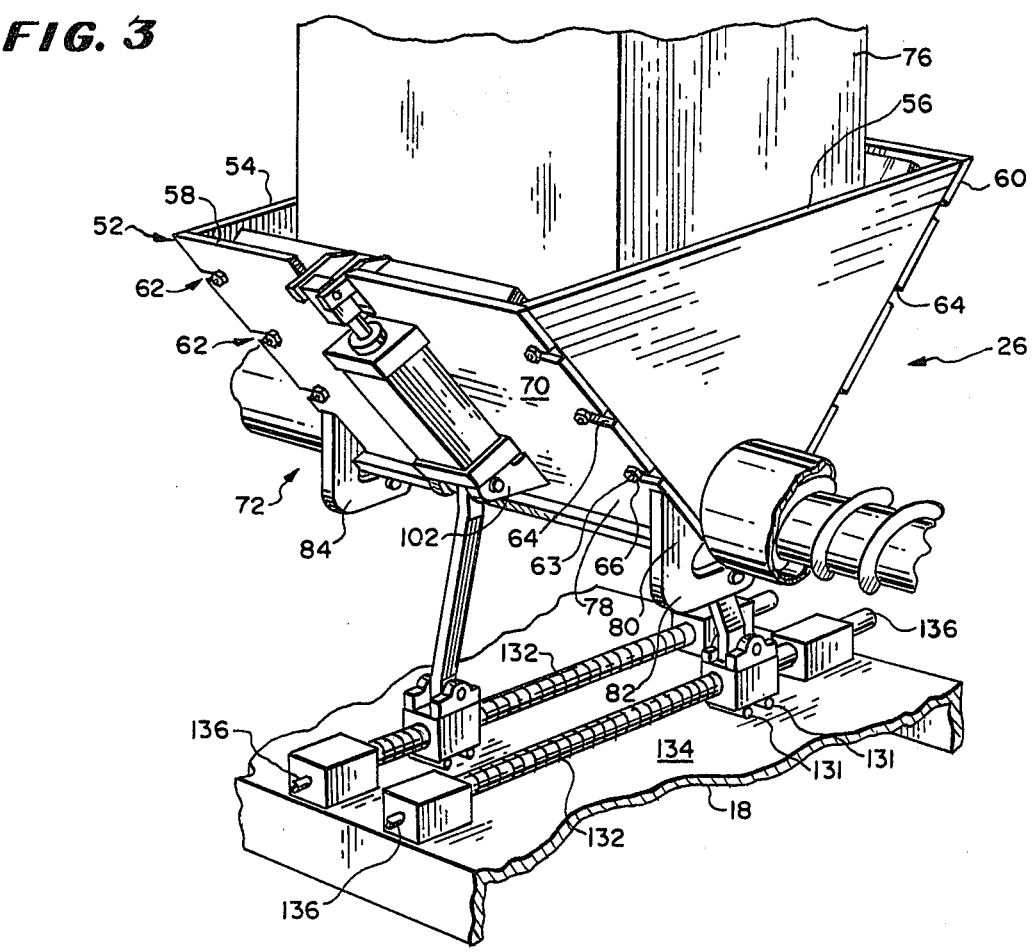
FIG. 3 is a perspective view of the double ram feed assembly of the present invention utilized in the extruder assembly shown in FIG. 1.

Referring now to the drawings in greater detail there is illustrated in FIG. 1 an extruder assembly 10 made in accordance with the teachings of the present invention.

The extruder assembly 10 includes a barrel 12 having a tapered, auger-like screw 14 (FIG. 2) therein. One end of the barrel 12 is supported on a mounting member 16 which is fixed to a base 18 for the extruder assembly 10. Adjacent the mounting member 16 on the base 18 is a transmission 20 which is coupled to one end of the screw 14. The transmission 20 is driven by a 2000 horsepower motor 22 as shown.

The barrel 12 is supported by another mounting member 24 on the base 18. Between the mounting members 16 and 24 there is positioned a novel double ram feed assembly 26 constructed and arranged in accordance with the teachings of the present invention as will be described in greater detail hereinafter.

The barrel 12 is also supported by a third mounting member 28 on the base 18 spaced downstream from the second mounting member 24. A heating jacket 30 is positioned about the barrel 12 between the mounting member 24 and the mounting member 28.

The outer end 32 of the barrel 12 is then clamped by a hydraulic clamp 34 to a screen chamber 36 which forms an extension of the barrel 12. The screen chamber 36 enables one to add or withdraw material from the barrel 12.

The end of the screen chamber 36 is clamped by a hydraulic clamp 38 to a die adapter 40 which forms the outer end of the extruder assembly 10 and in which there is positioned a die (not shown) having multiple openings (not shown) therein through which a plastic material is extruded into a chamber 42 where a cutting blade assembly (not shown) of a pelletizer 44 is situated adjacent the die for cutting the spaghetti like streams of plastic coming through the die into pellets.

Typically the chamber 40 has inlet and outlet water ports such that water flows through the chamber 40 for the purpose of cooling the pellets and for the purpose of removing pellets from the pellet forming area adjacent the die openings.

Figure 4:
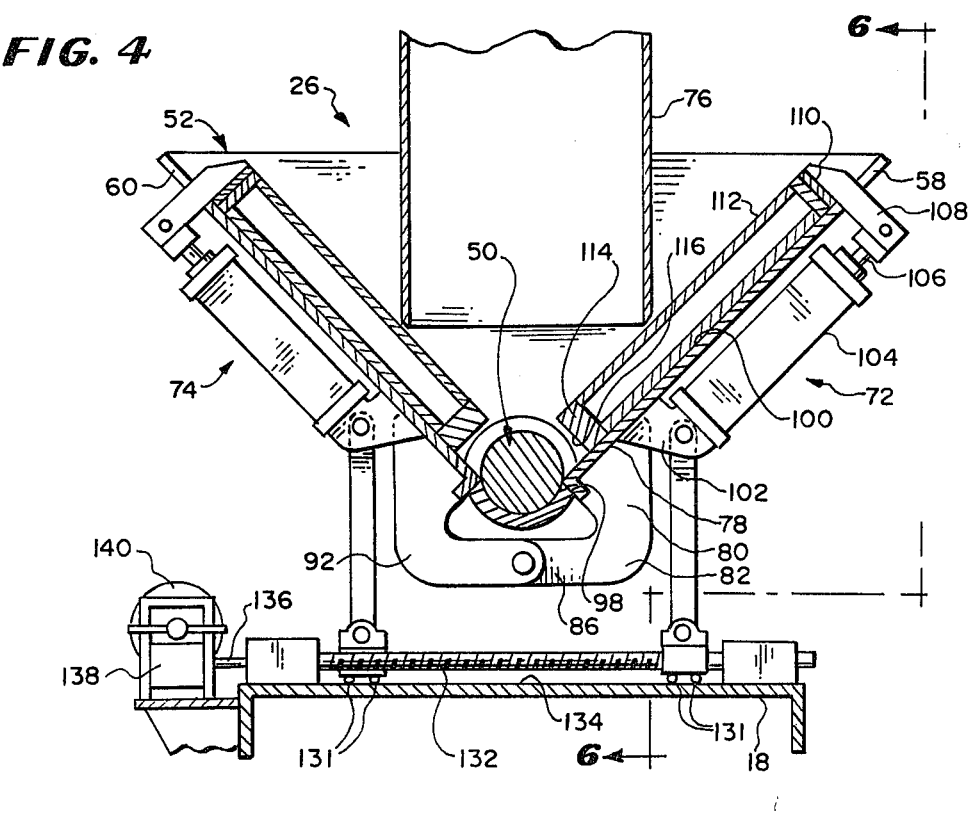
FIG. 4 is a sectional view taken along line 4—4 of FIG. 2.
Figure 5:
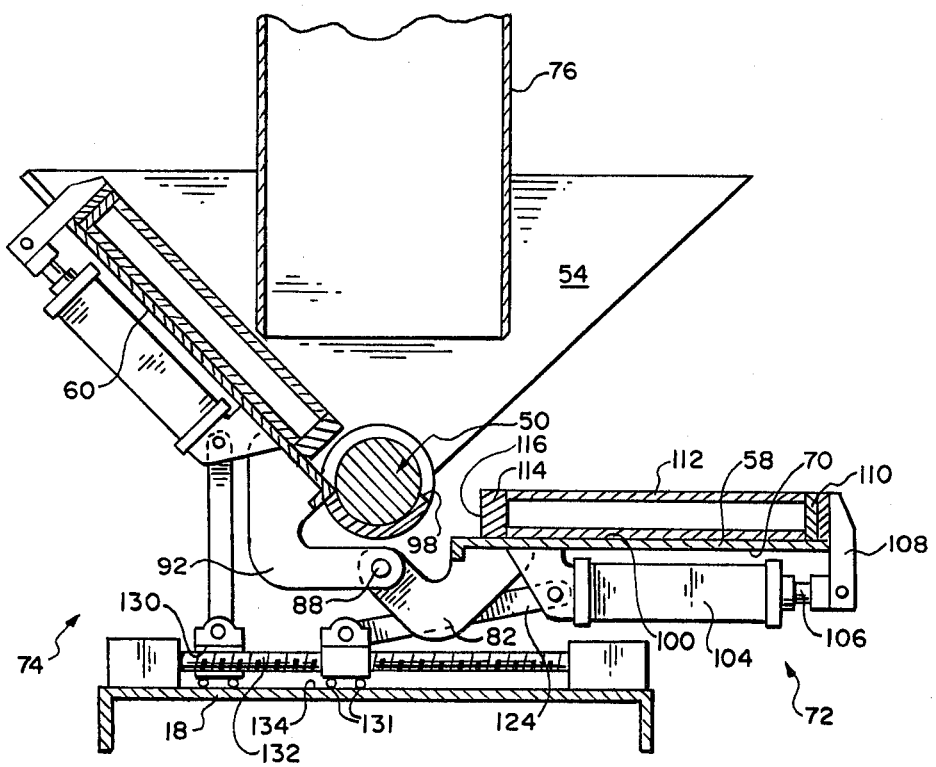
FIG. 5 is a view similar to FIG. 4 but showing one of the ram assemblies in a lowered position.

As best shown in FIGS. 2, 4 and 5, the area of the barrel 12 between the first mounting member 16 and the second mounting member 24 has a slot 50 formed therein about which is mounted the double ram feed assembly 26. As shown, the double ram feed assembly 26 also includes a hopper 52 having two spaced apart V-shaped end plates 54 and 56 which are supported on or fixed to the barrel 12 on either side of the slot 50. Releasably fixed to the end plates 54 and 56 on opposite sides of the slot 50 are first and second ram plates 58 and 60. These ram plates 58 and 60 form sidewalls of the hopper 52 and are releasably fixed in place by a plurality of fasteners 62. Such fasteners 62 can take the form of threaded studs 63 mounted at one end to a side edge of the end plate 54 or 56 and are receivable in slots 64 in a side edge of the ram plate 58 or 60. A nut 66 is then received on the end of each studs 63 and drawn up against undersurface 70 of the ram plate 58 or 60. The ram plates 58, 60 serve a dual function, each forming part of one of two pivotable ram subassemblies or sections 72, 74 of the double ram feed assembly 26 and at the same time forming a sidewall of the V-shaped hopper 52.

Above and extending into the hopper 52 is a duct 76 for feeding material such as powdered plastic material or globs of molten material, typically called "pigs", into the hopper 52. Such globs are typically formed from polyethylene plastic material. Prior to insertion through the duct 76 in batches, a small amount of pigment is mixed with the polyethylene and the molten colored polyethylene is dropped through the duct 76 into the hopper 52.

The ram assemblies 72 and 74 are arranged to push the globs of molten material through the slot 50 into the barrel 12 and into engagement with the screw 14 so that the screw 14 can then move the molten plastic material toward the extruder die (not shown) mounted in the die adapter 40.

Since the ram assemblies 72 and 74 are mirror images of each other, only the ram assembly 72 will be described in detail, it being understood that the ram 74 is substantially identical to and a mirror image of ram assembly 72.

As shown, the ram assembly 72 includes the ram plate 58. Fixed to the bottom margin 78 of the plate 58, at spaced apart locations thereon, are the ends 80 of two L shaped arms 82 and 84. The other end 86 of each L shaped arm 82, 84 is pivotally connected to a pivot shaft 88 or 90 which is parallel to the screw 14, and depends from and is fixed to the barrel 12. The pivot shafts 88 and 90 are coaxial.

Similar L shaped arms 92 and 94 are mounted between the other ram plate 60 and the pivot shafts 88 and 90 to permit pivotable movement of each pivotable ram assembly 72 and 74 about the coaxial pivot shafts 88 and 90 from a raised position as shown in FIG. 4 where the ram plate 58 forms part of the hopper 52 and an inner end 96 of the ram plate 58 abuts an edge 98 of the slot 50 in the barrel 12, to a lowered position as shown in FIG. 5 where an upper surface 100 of the ram plate 58 is exposed for cleaning and maintenance.

As shown in FIG. 5, a weldment 102 is fixed at one end thereof to the undersurface 70 of the ram plate 58 and at the other end to a piston and cylinder assembly 104 having a piston rod 106 extending from the outer end thereof. At the outer end of the piston rod 106 is an arm or dog 108 extending laterally therefrom. The arm 108 is fixed, such as by welding, to the outer end 110 of a generally rectangular, box shaped ram 112. As shown, the ram 112 is positioned for movement on the upper surface 100 of the ram plate 58. Another end 114 of the ram 112 has a ram surface 116 which is positioned to engage the "pigs" of molten plastic material which are fed into the hopper 52 and forced through the slot 50 into the barrel 12 and in engagement with the screw 14 on movement of ram 112.

In the lowered position of the ram assembly 72 as shown in FIG. 5, not only is the upper surface 100 thereof exposed, but also the ram 112 is exposed and unobstructed so that the upper surface 100 and the ram 112 can be cleaned and other maintenance operations performed thereon.

Figure 6:
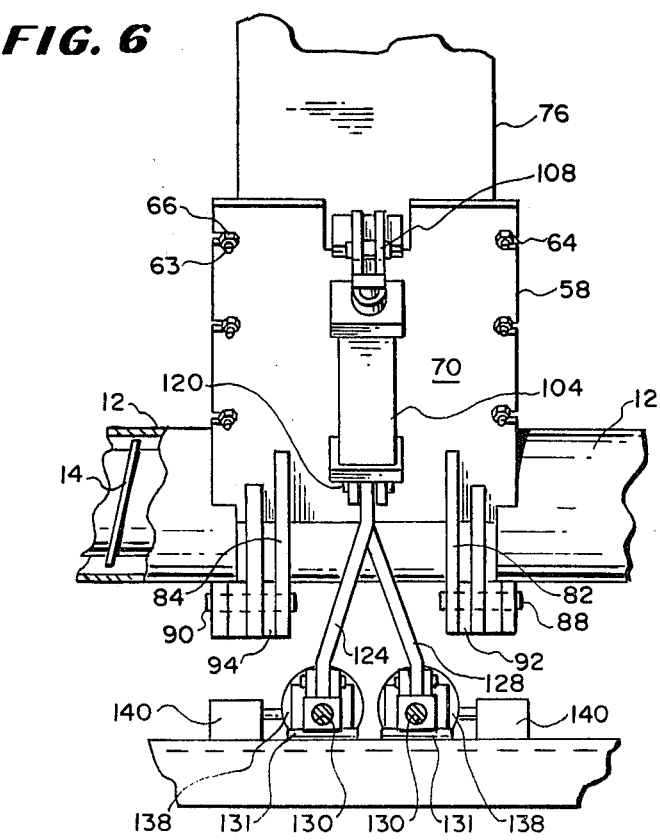
FIG. 6 is a side sectional view taken along line 6—6 of FIG. 4.

As shown in FIG. 6, the weldment 102 is bifurcated and has a pin 120 inserted through aligned openings in the bifurcated end and across a slot 122 formed by the bifurcated end. One end of an articulatable arm 124 is pivotally mounted on the pin 120 for pivotally mounting same to the weldment 102.

The other end of the articulated arm 124 is pivotally connected to an adjustably positionable member 128 which has a threaded throughbore 130 therethrough so that it can be received on a threaded shaft 132. Mounted to the underside of the adjustably positionable member 128 are two rollers 131 which ride on an upper flat surface 134 of the base 18.

The shaft 132 is journalled on the base 18 and one outer end 136 of the threaded shaft 132 is connected to a gear reducer 138 driven by a motor 140.

It will be apparent from FIGS. 4, 5 and 6 that when it is desired to move the ram assembly 72 from the lowered position shown in FIG. 5 to the raised position shown in FIG. 4, the motor 140 is operated to drive the gear reducer 138 thereby to drive the threaded shaft 132 to cause the adjustably positionable member 128 to move laterally, from left to right viewing the same as shown in FIG. 5, to exert an upward force on the weldment 102.

Because of the weight of the ram assembly 72, shear forces are exerted by the adjustably positionable member 128 on the shaft 132. These shear forces are greatly minimized by the rolling engagement of the rollers 131 on the upper surface 134 of the base 18, i.e., a rolling bearing support of the adjustably positionable member 128 on the base 18.

After the member 128 is moved all the way to the right, the adjustably positionable member 128 is directly under the weldment 102 as shown in FIG. 4 and the ram plate 58 is moved into engagement with the edges of the end plates 54 and 56 and the threaded studs 63, which can be pivotablly mounted to the margin adjacent the edge of each end plate 54 and 56, are then moved into the slots 64 and nuts 66 threaded thereon to secure the ram plate 58 in place to form the hopper 52.

With the novel double ram feed assembly 26 of the present invention comprising two pivotable ram assemblies 72 and 74 as shown in FIGS. 3–6, the extruder assembly 10 of the present invention simplifies cleaning and maintenance of the ram assemblies 72 and 74 and materially reduces the cost of maintenance and repair of the ram assemblies 72 and 74 such as the cost for material handling equipment for handling the components of the ram assembly if it were not pivotably mounted in the manner described above and the cost of downtime and man power that is incurred in cleaning and maintaining ram assemblies which are fixed in place.

From the foregoing description it will be apparent that the extruder assembly 10 of the present invention having the novel double ram feed assembly 26 with pivotable ram assemblies 72 and 74 has a number of advantages, some of which have been described above and others of which are inherent in the invention. Also it will be apparent that many modifications can be made to the extruder assembly of the present invention without departing from the teachings of the present invention. Accordingly, the scope of the invention is only to be limited as necessitated by the accompanying claims.

We claim:

1. In an extruder assembly including a barrel, a screw received within said barrel, drive means connected to one end of said screw for driving same, a slot in said barrel, feeding means associated with said slot for feeding material through said slot into said extruder barrel, and extruding means at the other end of said barrel through which material is forced by said screw, the improvement residing in said feeding means comprising at least one ram feed assembly including a ram plate positioned at one side of said slot in said barrel and a ram positioned for movement on the upper surface of said ram plate, means for moving said ram plate between an upper position where said ram plate forms a material feeding plate and where material is forced by said ram into said slot, and a lower position where said upper surface of said ram plate and said ram are exposed for maintenance and repair.

2. The ram feed assembly according to claim 1 including a weldment fixed to the underside of said ram plate adjacent a lower edge thereof, a piston and cylinder assembly having one end fixed to said weldment and extending parallel to said ram plate, an arm connected to the other end of said piston and cylinder assembly and fixed to the outer end of said ram, such that operation of the piston and cylinder assembly will cause sliding movement of said ram on said upper surface of said ram plate toward and away from said slot.

3. The ram feed assembly according to claim 1 wherein said means for moving said ram plate between an upper position and a lower position include pivot shaft means mounted parallel with said extruder screw and means pivotally mounted on said pivot shaft means and secured to the bottom margin of said ram plate.

4. The ram feed assembly according to claim 3 wherein said means for moving said ram plate between an upper position and a lower position include an adjustably positionable member, means for adjustably positioning said positionable member and an articulatable member connected to and between said ram plate and said positionable member.

5. The ram feed assembly according to claim 4 wherein said pivot shaft means include two spaced apart coaxial pivot shafts and said means for pivotably mounting said ram plate to said pivot shafts include two L shaped arms which are fixed at one end to the lower margin of said ram plate and which are pivotally mounted at the other end to one of said pivot shafts.

6. The ram feed assembly according to claim 1 wherein said means for moving said ram plate between an upper position and a lower position include an adjustably positionable member, means for adjustably positioning said positionable member and an articulatable member connected to and between said ram plate and said positionable member.

7. The ram feed assembly according to claim 6 wherein said articulatable member is an arm which is pivotally connected at one end to a weldment fixed to the underside of said ram plate adjacent a lower edge thereof and which is pivotally connected to said other end to said adjustably positionable member.

8. The ram feed assembly according to claim 6 wherein said adjustably positionable member has a throughbore therethrough which is threaded and said means for positioning said positionable member comprise a shaft which is received in and through said throughbore and which is journalled at each end thereof to a fixed support and a drive motor for driving said shaft so that said positionable member can be moved linearly along the length of said threaded shaft thereby to permit said arm to be articulated between a first position where said positionable member is spaced laterally from said weldment and said ram plate is in a lower position and a second position wherein said positionable member is situated beneath said weldment and said ram plate is in a raised inclined position.

9. The ram feed assembly according to claim 8 wherein said adjustably positionable member has rollers mounted on the underside thereof to provide rolling bearing support for said adjustably positionable member on a flat base surface thereby to minimize shearing forces on said threaded shaft from the weight of said ram plate and ram.

10. The ram feed assembly according to claim 9 including two substantially identical pivotable ram sections, each positioned on opposite sides of said barrel between said end plates.

11. The ram feed assembly according to claim 10 wherein a feed inlet duct extends into said hopper and each ram is movable along said upper surface of one of said ram plates and beneath one edge of said inlet duct.

12. The ram feed assembly according to claim 6 wherein said adjustably positionable member has rollers mounted on the underside thereof to provide rolling bearing support for said adjustably positionable member on a flat base surface.

13. The ram feed assembly according to claim 12 including means for releasably holding said ram plates to said end plates in the upper positions of said ram plates such that said ram plates form inclined side walls of said hopper.

14. The ram feed assembly according to claim 1 including a hopper formed from two spaced apart end plates each situated adjacent one end of said slot, and said ram plate forming one side wall of said hopper when it is in the upper position.

15. The ram feed assembly according to claim 14 wherein said end plates are V shaped and said ram plates in the upper position of said ram sections form a V thereby to define a V shaped hopper.

* * * * *